US008335639B2

(12) United States Patent
Bruns et al.

(10) Patent No.: US 8,335,639 B2
(45) Date of Patent: Dec. 18, 2012

(54) METHOD AND DEVICE FOR CONTROLLING THE DRIVE OF A MOTOR VEHICLE

(75) Inventors: Carsten Bruns, Regensburg (DE); Andreas Läufer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 455 days.

(21) Appl. No.: 12/540,781

(22) Filed: Aug. 13, 2009

(65) Prior Publication Data

US 2010/0070131 A1 Mar. 18, 2010

(30) Foreign Application Priority Data

Aug. 20, 2008 (DE) ......................... 10 2008 038 446

(51) Int. Cl.

*G06F 19/00* (2011.01)
*G06G 7/70* (2006.01)
*G06G 7/76* (2006.01)

(52) U.S. Cl. .......... 701/123; 701/99; 701/101; 701/104; 340/439

(58) Field of Classification Search .................... 701/29, 701/29.1, 64, 99, 101, 102, 104, 105, 112, 701/115, 123; 340/439, 441; 123/179.4
See application file for complete search history.

(56) References Cited

U.S. PATENT DOCUMENTS 4,539,868 A 9/1985 Habu
4,555,691 A 11/1985 Hosaka et al.
4,647,902 A * 3/1987 Teshima et al. ............... 340/439
7,532,974 B2 * 5/2009 Sato et al. ..................... 701/123
7,580,808 B2 * 8/2009 Bos ............................... 702/127
2004/0148084 A1 * 7/2004 Minami .......................... 701/55
2006/0287841 A1 * 12/2006 Hoshi et al. ................... 702/182
2007/0129878 A1 * 6/2007 Pepper .......................... 701/123

FOREIGN PATENT DOCUMENTS

DE 3128080 A1 2/1983
DE 4412438 C1 11/1995
DE 19925230 B4 12/1999

* cited by examiner

*Primary Examiner* — Thomas Tarcza
*Assistant Examiner* — Rami Khatib
(74) *Attorney, Agent, or Firm* — King & Spalding L.L.P.

(57) ABSTRACT

A method and a device for controlling the drive of a motor vehicle having an internal combustion engine (ICE) have a control device to which operating parameters of the drive and parameters influencing the driving operation of the motor vehicle are supplied. On the basis of these parameters the control device enables or terminates the implementation of fuel consumption reduction measures (STST) if specific parameter constellations are present. During the operation of the vehicle the number and/or the duration the possible fuel consumption reduction measures and fuel consumption reduction measures actually carried out are/is determined and the number and/or the duration of the possible fuel consumption reduction measures and the number and/or the duration of the fuel consumption reduction measures actually carried out are/is correlated. From this, a variable (R) is determined which represents a measure for the implementation of the possible fuel consumption reduction measures.

20 Claims, 3 Drawing Sheets

METHOD AND DEVICE FOR CONTROLLING THE DRIVE OF A MOTOR VEHICLE

CROSS-REFERENCE TO RELATED APPLICATIONS

This application claims priority to DE Patent Application No. 10 2008 038 446.1 filed Aug. 20, 2008, the contents of which is incorporated herein by reference in its entirety.

TECHNICAL FIELD

The present invention relates to a method and a device for controlling the drive of a motor vehicle having a control device to which operating parameters of the drive and parameters influencing the driving operation of the motor vehicle are supplied and on the basis of said parameters the control device enables and terminates the implementation of fuel consumption reduction measures if specific parameter constellations are present.

BACKGROUND

Concepts aimed at reducing fuel consumption and pollutant emissions are being introduced to an increasing extent in modern motor vehicles. These concepts include, inter alia, the implementation of what is called an automatic stop-start device, hereinafter referred to for simplicity as automatic stop-start, by means of which an internal combustion engine driving the motor vehicle can be switched off and started again independently of an intervention by the driver of the motor vehicle. In this case the internal combustion engine is switched off in particular in relatively long idle running phases in which the driving power of the internal combustion engine is not required. In this way considerable savings in fuel consumption can be achieved, in particular in urban traffic conditions.

However, the switching-off of the internal combustion engine by the automatic stop-start function is subject to restrictions. For example, it makes sense for reasons of comfort and economy not to allow the internal combustion engine to be switched off by the automatic stop-start in all cases, but rather to prevent this in certain traffic and driving situations, for example in stop-and-go operation (repeated stopping with short driving distance between, in a traffic jam for example).

DE 44 12 438 C1 discloses a method wherein in a first method step the running combustion engine is automatically switched off via an electronic control device by interruption of the fuel supply if specific engine stop conditions are fulfilled for the duration of a predetermined holding time. In a second method step the previously stopped combustion engine is restarted automatically by means of the control device if specific engine start conditions are fulfilled. One of the engine stop conditions is that the traveling speed of the motor vehicle is below a predetermined limit value, is preferably zero, and the rotational speed of the combustion engine with the drive clutch closed is below a predetermined value. The engine start conditions includes at least that no gear is engaged and the clutch pedal is pressed, or that no gear is engaged and the engine temperature has risen above a predetermined value.

Many of the known automatic stop-start systems can be manually deactivated by the driver of the vehicle equipped with the internal combustion engine, as a result of which the potential in terms of possible fuel saving is not or at least not fully exploited.

In a motor vehicle that is equipped with a gearbox that is to be shifted manually or with an automated manual transmission, minimizing the fuel consumption or, as the case may be, the polluting emissions of the motor vehicle requires the driver to make a gear change at the right time as a function of the operating point of the internal combustion engine. This applies in particular when shifting into a higher gear.

In this respect it is known to determine the optimal time for a gear change and communicate this to the driver, by means of a display on the instrument panel for example.

U.S. Pat. No. 4,555,691 discloses defining, or, as the case may be, determining, the shifting point as a result of reaching an engine speed threshold and a vehicle speed threshold.

U.S. Pat. No. 4,539,868 describes a method wherein initially the current engine operating point characterized by engine load and engine rotational speed is calculated. Said operating point is placed into the consumption characteristic map of the engine, whereupon a comparison with the consumption optimum is carried out. If a better consumption is possible, a lamp is lit up on the instrument panel.

A similar method is known from DE 31 28 080 A1, wherein after comparison of operating data with a stored consumption characteristic map the controller outputs a signal to a gear shift display when the stored limit values are chosen such that when the limit values are exceeded at least an equally great tractive force with a greater throttle valve opening is available at the drive wheels in the next higher gear.

The driver of the motor vehicle can follow a gear shift recommendation of this kind regarding an optimal shifting time or can also ignore it, as a result of which the potential in terms of possible fuel saving is not or at least not fully exploited.

Hybrid drives are known as a further possibility of lowering the fuel consumption and harmful emissions of a motor vehicle. They represent a combination of at least two different drive systems, usually a combination of a combustion engine with an electric motor. The aim of the hybrid drive is e.g. to use the pollutant-free electric drive first and foremost in urban traffic and to use the combustion engine in long-distance traffic and on interstates. In this case too a preferably visual and/or audible gearshift recommendation can be output to the driver of the motor vehicle with the aim of prompting him to switch manually from one mode of operation to the other mode of operation.

The time of the recommendation to shift to a mode of operation that is optimal in terms of fuel consumption and pollutant emissions can be transmitted wirelessly into the motor vehicle for example by means of signals from a stationary traffic installation within the infrastructure, e.g. when the vehicle is being driven into the pollutant-limited zone of a city center.

What has already been said above also applies here, namely that the driver of the motor vehicle can follow or ignore said shift recommendation. In the latter case valuable potential for saving fuel and lowering emissions is lost.

The same statements apply to what is termed a bivalent motor vehicle that is driven by means of an internal combustion engine which can be powered by two different types of fuel and produces different exhaust gas emissions as a function of the currently selected fuel type. Thus, in the case of an internal combustion engine that can be powered optionally by means of natural gas (gaseous (CNG) or liquid (LPG)) or by means of gasoline, for example, the pollutant emissions during operation by means of natural gas are much lower owing to its varietal purity and its high hydrogen content than during operation using gasoline fuel.

In addition to an automatic switchover between the two fuel types triggered by a control device, when for example one type of fuel is running low, it is usually also possible for the driver of such a motor vehicle to be able to switch between the two modes of operation simply by pressing a button. Similarly, as already mentioned above, a shift recommendation, which the driver can once again implement or ignore, can be output, when the vehicle is entering a pollutant-limited zone of a city center for example.

SUMMARY

According to various embodiments, a method and a device for controlling the drive of a motor vehicle can be provided which enable the use of fuel and pollutant reduction measures to be optimized in a simple manner.

According to an embodiment, a method for controlling the drive of a motor vehicle which has an internal combustion engine comprising a control device to which operating parameters of the drive and parameters influencing the driving operation of the motor vehicle are supplied and on the basis of said parameters the control device enables and terminates the implementation of fuel consumption reduction measures if specific parameter constellations are present, May comprise the steps of:—during the operation of the vehicle the number and/or the duration of the possible fuel consumption reduction measures is/are determined,—the number and/or the duration of fuel consumption reduction measures actually carried out during operation is/are determined,—the number and/or the duration of the possible fuel consumption reduction measures and the number and/or the duration of the actually carried out fuel consumption reduction measures are correlated, and—a variable is determined therefrom which represents a measure for the implementation of the possible fuel consumption reduction measures.

According to a further embodiment, the fuel consumption reduction measure may consist in the activation of an automatic stop-start device for the internal combustion engine. According to a further embodiment, the fuel consumption reduction measure may consist in a shift recommendation to the driver of the motor vehicle with regard to a gear change that is to he performed. According to a further embodiment, the fuel consumption reduction measure may consist in a changeover recommendation to the driver of the motor vehicle with regard to the type of drive to be used for the motor vehicle. According to a further embodiment, the fuel consumption reduction measure may consists in a changeover recommendation to the driver of the motor vehicle with regard to the type of fuel to be used for the internal combustion engine. According to a further embodiment, the quotient from the number of actually carried out fuel consumption reduction measures and the number of possible fuel consumption reduction measures may be used as the variable. According to a further embodiment, the quotient from the duration of the actually carried out fuel consumption reduction measures and the duration of the possible fuel consumption reduction measures may be used as the variable. According to a further embodiment, the difference from the number of actually carried out fuel consumption reduction measures and the number of possible fuel consumption reduction measures may be used as the variable. According to a further embodiment, the difference from the duration of the actually carried out fuel consumption reduction measures and the duration of the possible fuel consumption reduction measures may be used as the variable. According to a further embodiment, the variable can be stored in a storage device of the control device. According to a further embodiment, the variable can be stored in a non-volatile manner in the storage device. According to a further embodiment, the variable can be read out from the storage device at predefined time intervals.

According to another embodiment, a device for controlling the drive of a motor vehicle, wherein the motor vehicle has an internal combustion engine, may comprise a control device to which operating parameters of the drive and parameters influencing the driving operation of the motor vehicle are supplied and on the basis of said parameters the control device enables and terminates the implementation of fuel consumption reduction measures if specific parameter constellations are present, wherein the device may be embodied for—determining the number and/or the duration of the fuel consumption reduction measures possible during the operation of the motor vehicle,—determining the number and/or the duration of the fuel consumption reduction measures actually carried out during the operation of the motor vehicle,—correlating the number and/or the duration of the possible fuel consumption reduction measures and the number and/or the duration of the fuel consumption reduction measures actually carried out,—deriving a variable from said correlation, which variable represents a measure for the implementation of the possible fuel consumption reduction measures.

BRIEF DESCRIPTION OF THE DRAWINGS

Exemplary embodiments are explained in more detail below with reference to the attached figures, in which.

DETAILED DESCRIPTION

The method according to various embodiments is suitable for controlling the drive of a motor vehicle that has an internal combustion engine and a control device to which operating parameters of the drive and parameters influencing the driving operation of the motor vehicle are supplied and on the basis of said parameters the control device enables and terminates the implementation of fuel consumption reduction measures if specific parameter constellations are present. According to the method, during the operation of the vehicle the number and/or duration of the possible fuel consumption reduction measures and the number and/or duration of fuel consumption reduction measures actually implemented during operation are determined, said values are correlated and a variable calculated therefrom which represents a measure for the implementation of the possible fuel consumption reduction measures.

The method according to various embodiments has the advantage that the implementation rate and consequently the acceptance of the measures provided by the manufacturer of the motor vehicle for the purpose of lowering fuel consumption and consequently the pollutant emissions can be determined in a simple manner. From this result deductions can be made with regard to the driving style and also the environmental awareness of the motor vehicle driver. The manufacturers of the motor vehicles can carry out improvement measures, for example extending or modifying the activation range (time of triggering, duration), in order to increase customer satisfaction. On the other hand there is the opportunity for the legislator to use the result of the frequency of use of the fuel consumption reduction measures as a control mechanism for its requirements—lowering fuel consumption or, as the case may be, limiting $CO_2$ emissions.

According to another embodiment, the variable which represents a measure for the implementation of the fuel consumption reduction measures is formed by forming the quotient from the number of actually implemented fuel consumption reduction measures and the number of possible fuel consumption reduction measures. This has the advantage that simple event counters can be used for determining the variable and only one simple arithmetic operation is necessary.

According to a further embodiment, the variable which represents a measure for the implementation of the fuel consumption reduction measures is formed by forming the quotient from the duration of the actually implemented fuel consumption reduction measures and the duration of the possible fuel consumption reduction measures. This has the advantage that simple timers can be used for determining the variable and only one simple arithmetic operation is necessary.

Figure 1:
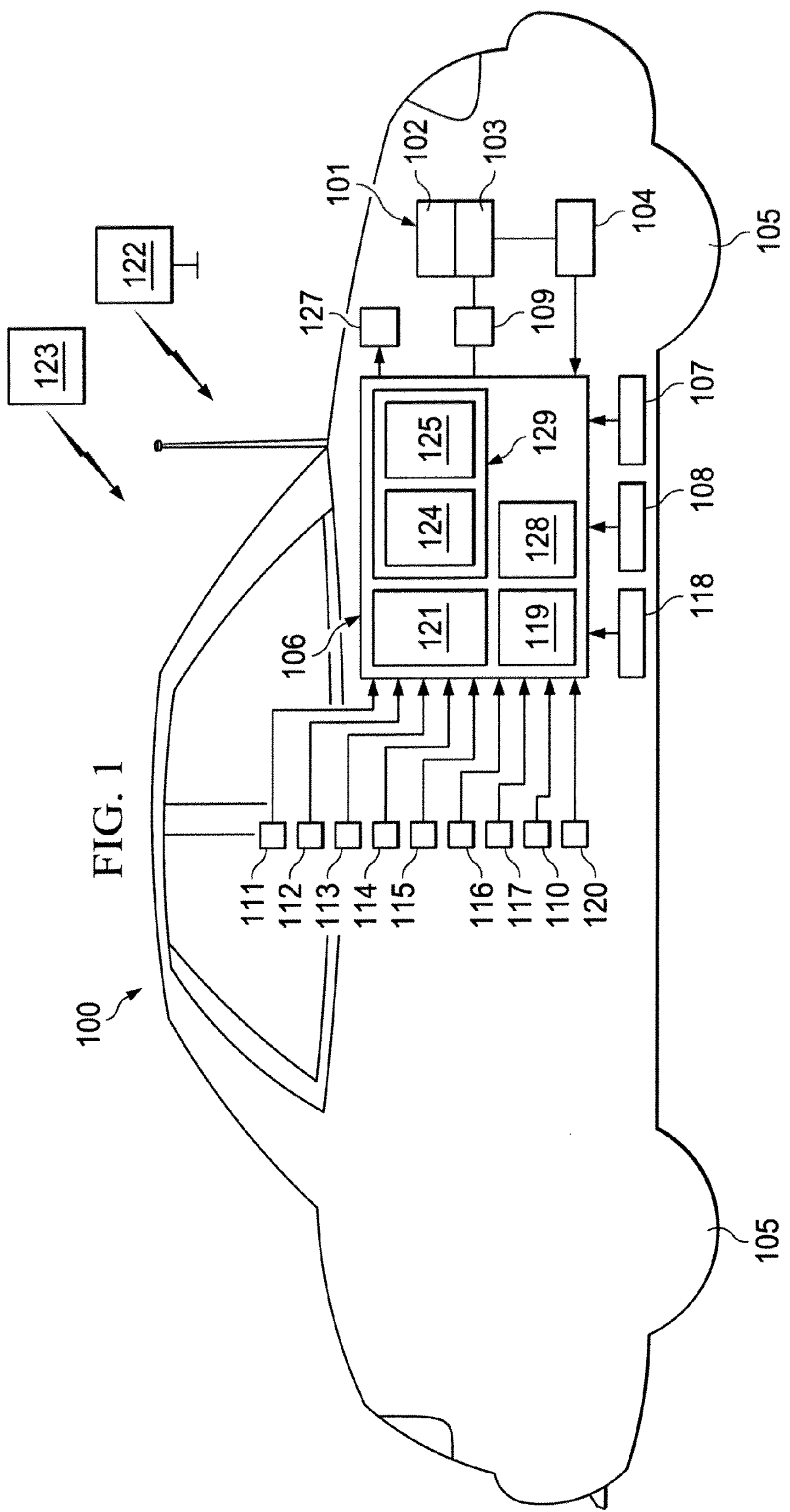
FIG. 1 shows a motor vehicle having associated drive means and a control device in a schematic representation.

FIG. 1 is a schematic representation depicting a motor vehicle 100, with only the components necessary to an understanding of the invention being shown. The motor vehicle 100 is equipped with a hybrid drive 101. The hybrid drive 101 comprises an electric motor 102 and an internal combustion engine 103 and is coupled by means of a gearbox 104 to at least one of the axles of the motor vehicle 100, such that the driving force can be transmitted to wheels 105 of the motor vehicle. The motor vehicle 100 can thus be driven in an electric mode by means of the electric motor 102 or in a combustion mode by means of the internal combustion engine 103. The changeover between electric mode and combustion mode is usually effected independently of an intervention by the motor vehicle driver by means of corresponding signals of a control device 106. In order to increase the flexibility of the motor vehicle 100, a changeover switch 107 is additionally provided which is to be actuated manually by the motor vehicle driver and by means of which the wishes of the motor vehicle driver with regard to the type of drive to be used can be implemented irrespective of the specifications of the control device 106.

The internal combustion engine 103 of the hybrid drive 101 can be embodied as a spark ignition internal combustion engine, as a diesel internal combustion engine or as an internal combustion engine which is powered by means of alternative energies such as natural gas, ethanol or benzene-ethanol mixtures.

In a simpler embodiment variant, instead of the hybrid drive 101, the motor vehicle 100 can also be driven by means of a single drive source, specifically by means of an internal combustion engine according to one of the aforementioned type.

If an internal combustion engine drive source that can be driven by means of two different fuels, for example CNG and gasoline, is used, a manual changeover by the motor vehicle driver is possible in many cases in addition to an automatic changeover between the two fuels. For this purpose a changeover switch is provided which is identified in FIG. 1 by the reference numeral 108.

The gearbox 104 is embodied as a manual gearbox or as an automated manual transmission.

Also assigned to the internal combustion engine is a starter device 109 for electrically starting the internal combustion engine 103 which is coupled to the crankshaft of the internal combustion engine 103. The starter device 109 can in this case comprise for example a conventional starter or a so-called integrated starter-generator. In the case of a hybrid drive the electric motor 102 can also handle the starting function.

A control device 106 is provided to which are assigned sensors which measure different measured variables and in each case determined the measured value of the measured variable. Operating variables of the internal combustion engine comprise the measured variables and quantities derived from the measured variables. Based on at least one of the measured variables, the control device 106 determines actuating variables which are then converted into one or more control signals for controlling the actuating elements by means of corresponding actuating drives. The control device 106 can also be referred to as a device for operating the internal combustion engine.

The sensors are for example one or more pedal position sensor 110 for detecting the position of an accelerator pedal and/or clutch pedal and/or brake pedal, a position sensor 120 for the position of a gearshift lever or shift position of the gearbox, a mass air meter 111 which detects a mass air flow upstream of a throttle valve, a throttle valve position sensor 112 which detects a degree of opening of said throttle valve, a temperature sensor 113 which measures an intake air temperature, an intake manifold pressure sensor 114 which measures a pressure in an intake manifold, a crankshaft angle sensor 115 which measures a crankshaft angle to which a rotational speed of the internal combustion engine 103 is then assigned, a temperature sensor 116 which measures a temperature of the coolant of the internal combustion engine 103, and at least one exhaust gas probe 117. Furthermore, the control device 106 is electrically connected to the changeover switches 107 and 108 and the starter device 109.

The control device also has a receiving and processing unit 121 for receiving and processing signals which are generated outside of the motor vehicle 100 and which are transmitted wirelessly to the motor vehicle 100 or, as the case may be, control device 106. These can be for example signals from stationary or mobile traffic installations 122 in the form of stop duration information at signal systems such as traffic lights and/or information from driver assistance systems 123 (navigation, position information, cruise control, topography, congestion information, traffic routing, gradients, inclines, etc.).

Depending on the embodiment, an arbitrary subset of the aforesaid sensors can be present or additional sensors can also be present.

The actuating elements are for example the throttle valve, the gas inlet and gas outlet valves of the internal combustion engine 103, one or more injection valves, sparking plugs, and the starter device 109.

A plurality of engine-characteristic-map-based engine management functions are implemented by software means in the control device 106. Implemented in particular in the control device 106 is what is termed an automatic stop-start 119 with the aid of which the internal combustion engine 103, if certain conditions and/or requirements are present, is automatically stopped and started independently of a driver of the motor vehicle 100 driven by means of the internal combustion engine 103. The automatic stop-start 119 is electrically connected to the starter device 109. In addition, the automatic stop-start 119 is assigned a switch 118 which is to be operated manually by the driver of the motor vehicle and with the aid of which the automatic stop-start 119 can be either activated or deactivated. Connected to the control device 106 is a display device 127 which signals one of the cited recommendations for initiating a fuel consumption reduction measure (change of gear, changeover recommendation, etc) to the driver of the motor vehicle.

Figure 2:
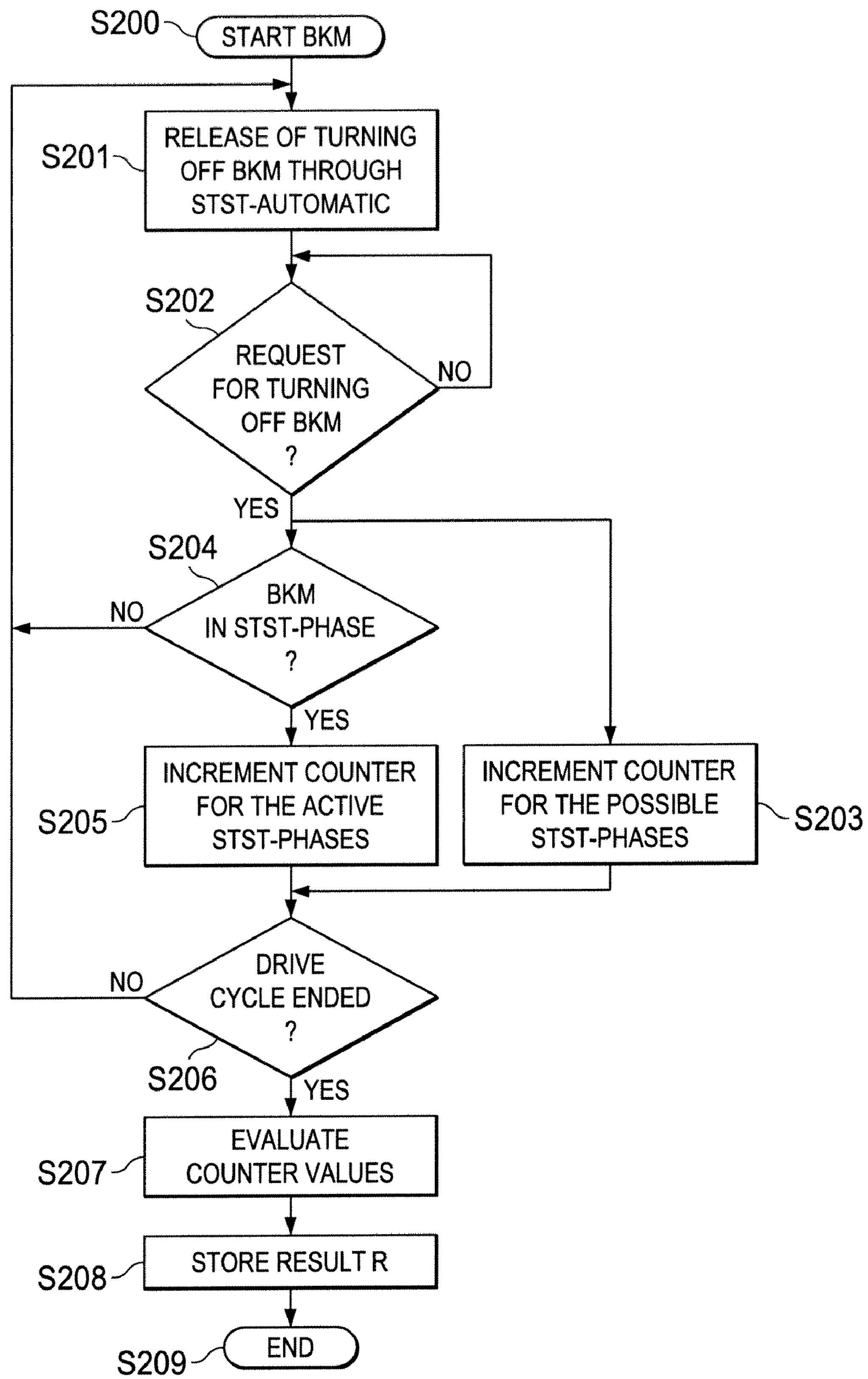
FIG. 2 shows a first exemplary embodiment of the method in the form of a flowchart.

Also provided in the control device 106 is an evaluation device 129 which has in particular a plurality of counters 124, 125 which either register a period of time or an occurring event and wherein the evaluation device 129 calculates from the counter readings a variable R which represents a measure for the implementation of the possible fuel reduction measures, as will be explained in more detail later with reference to FIGS. 2 and 3. Said variable is stored in a storage device 128 and can be read out and evaluated at predetermined time intervals, for example as part of a service prescribed by the motor vehicle manufacturer or at statutorily required general technical inspections.

A first exemplary embodiment of a program for controlling the drive for the motor vehicle 100 shown in FIG. 1 is explained in more detail below with reference to FIG. 2 in the form of a flowchart. An automatic stop-start (STST) 119 of the type cited in the introduction is provided as a fuel consumption reduction measure for the motor vehicle 100.

The program is preferably stored in a program memory of the control device 106 and is carried out during the operation of the motor vehicle 100 in a computing unit of the control device 106.

The program is preferably started at a step S200, for example close in time to the starting of the motor vehicle 100. If necessary program variables can be initialized in step S200.

As shown in step S201, the remainder of the method proceeds on the basis of an operating state in which the switching-off and starting of the internal combustion engine 103 is enabled by the automatic stop-start 119.

Since this is permitted only under certain conditions, operating parameters of the internal combustion engine 103 and parameters influencing the driving operation of the motor vehicle 100 are read in and checked to determine whether these fulfill predefined conditions. For example, it is checked whether the motor vehicle 100 is stationary, the coolant temperature of the internal combustion engine 103 and/or the outside temperature or the battery voltage have exceeded certain threshold values, and/or a neutral gear has been engaged and/or a clutch pedal is not actuated. Additional or different parameters of the type cited in the introduction in different combinations can also be checked to verify whether they have fulfilled predefined conditions. If the conditions have been met, the internal combustion engine 100 could be switched off by the automatic stop-start 119 for the purpose of saving fuel and started again following a request by the driver of the motor to resume driving.

In a step S202 it is checked whether a request for the internal combustion engine 103 to be switched off by the automatic stop-start 119 is present. If the result of the check in step S202 is negative, the check is repeated until it yields a positive result. If appropriate, a predefined wait period can be inserted between the succeeding checks.

If the result of the check in step S202 is that a request for the automatic stop-start 119 to switch of the internal combustion engine 103 is present, the counter reading of the counter 124, which registers the number of possible stop-start phases, is incremented in step S203. It is also checked in the case of a positive result of the check in step S202 whether the internal combustion engine 103 is also actually switched off, i.e. the internal combustion engine 103 is in a stop-start phase (step S204). This can be verified, for example, by interrogating the position of the switch 118, by the actuation of which the driver of the motor vehicle can deactivate the automatic stop-start 119. If the automatic stop-start 119 has been switched off by the driver of the motor vehicle, a branch is made to step S201; otherwise the counter reading of the counter 125, which registers the number of active, i.e. actually carried out stop-start phases, is likewise incremented in step S205.

In a succeeding step S206 it is checked whether the driving cycle of the motor vehicle 100 has been terminated. The driving cycle is to be understood as meaning the period of time between the starting of the motor vehicle initiated manually by the driver of the motor vehicle, initiated for example by the turning of the ignition key, and the manually initiated switching-off of the motor vehicle by the driver of the motor vehicle, for example again by turning the ignition key. However, the driving cycle can also be defined in any other way, for example as a predefined time period of one month, one year, service intervals, etc. or as a predefined number of miles traveled by the vehicle.

If the driving cycle is not yet terminated, a branch is made to step S201; otherwise the counter reading of the counters 124, 125 are evaluated in step S207. This can happen, for example, such that the quotient R is formed from the number of possible stop-start phases determined by the counter 124 and the number of actually carried out stop-start phases determined by the counter 125. The variable R obtained in this way represents a measure for the implementation of the possible fuel consumption reduction measures, i.e. of the stop-start phases in this exemplary embodiment. If all possible fuel consumption reduction measures are implemented, the value of the variable R is equal to 1; otherwise it is less than 1. A very small value therefore indicates that a saving potential present in terms of fuel consumption and, associated therewith, a reduction in pollutant emissions has not been used by the driver of the motor vehicle.

In a following step S208, the value of the variable R is stored in the storage device 128 of the control device 106 such that it can be read out for example at regular time intervals or as necessary and if necessary further steps, for example as a control mechanism for statutory requirements such as compliance with $CO_2$ emissions, can be initiated. The method is terminated in step S209.

Instead of the counters 124, 125, which in each case register the number of possible or actually carried out stop-start phases and can therefore also be referred to as event counters, it is possible to use so-called time counters, which in each case register the duration of the possible or actually carried out stop-start phases. In this way it is possible also to take into account the cases in which the driver of the motor vehicle follows the request to switch off the internal combustion engine, but shortens the stop phase by manual intervention.

In this case the evaluation in step S207 is performed in such a way that the quotient is formed from the duration of the possible stop-start phases determined by the counter 124 and the duration of the actually carried out stop-start phases determined by the counter 125.

A second exemplary embodiment of a program for controlling the drive for the motor vehicle 100 shown in FIG. 1 is explained in more detail below with reference to FIG. 3 in the form of a flowchart. A shift recommendation for a change of gear of the type cited in the introduction is provided as a fuel consumption reduction measure for the motor vehicle 100.

The program is preferably stored in a program memory of the control device 106 and is carried out during the operation of the motor vehicle 100 in a computing unit of the control device 106.

The program is preferably started in a step S200, close in time to the starting of the motor vehicle 100 for example. If necessary program variables can be initialized in step S200.

In step S210 it is checked whether a shift recommendation for a change of gear has been output to the driver of the motor vehicle. Such a shift recommendation is output if the control device 106 has determined the optimal shifting time from parameters of the type cited in the introduction.

If the result of the check in step S210 is negative, the check is repeated until it yields a positive result. If appropriate, a predefined waiting period can be inserted between the succeeding checks.

If the result of the check in step S210 is that a shift recommendation for a gear change has been output to the driver of the motor vehicle, the counter reading of the counter 124, which registers the number of possible shift recommendations, is incremented in step S212. In addition, in the event of a positive result of the check in step S210, it is checked whether the driver of the motor vehicle has also followed the shift recommendation, i.e. a change of gear has taken place. This can be confirmed for example by means of an analysis of the signal from the position sensor 120 (FIG. 1) for the gearshift lever or for the shift position of the gearbox (step S213).

Figure 3:
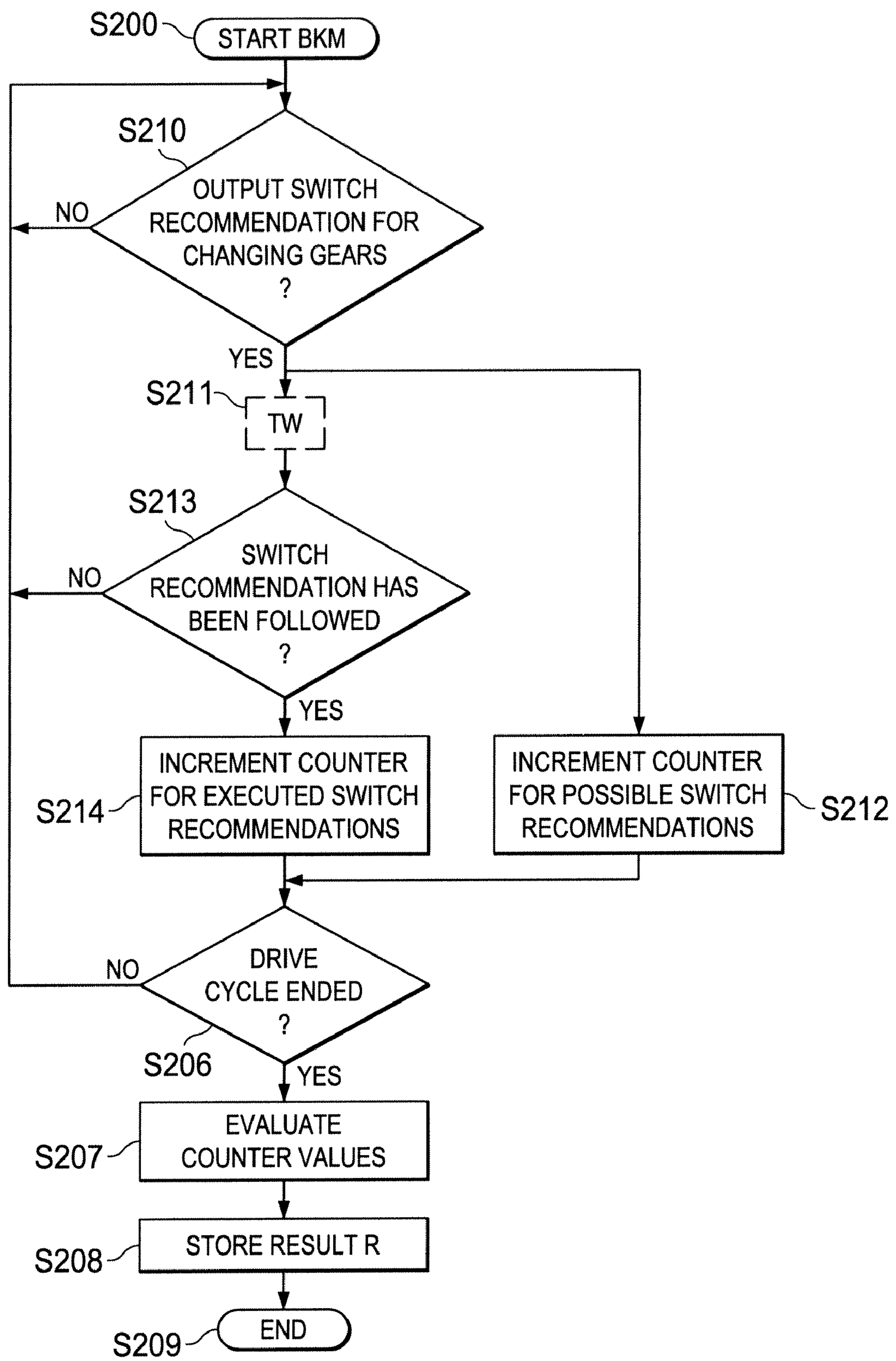
FIG. 3 shows a second exemplary embodiment of the method in the form of a flowchart.

Alternatively it is possible to perform the check in step S213 with regard to a carried out shift operation with a time delay, as indicated in FIG. 3 by an intermediate step S211 with a waiting time TW. In this way it is possible to exclude driving states of the type in which the driver of the motor vehicle was unable to follow the output shift recommendation because, for example, he was obliged to brake a short time later, i.e. within an appropriate reaction time following the shift recommendation.

If the shift recommendation taking into account the aforementioned waiting time was not followed, a branch is made to step S210; otherwise, in step S213, the counter reading of the counter 125, which registers the number of active, i.e. actually carried out shift recommendations, is likewise incremented.

The following steps S206 to S209 are identical to the steps explained with reference to FIG. 2, with the proviso that the quotient R is formed from the number of possible shift recommendations determined by the counter 124 and the number of actually carried out shift recommendations determined by the counter 125. The variable R obtained in this way in turn represents a measure for the implementation of the possible fuel consumption reduction measures, i.e. the implementation of the shift recommendations in this exemplary embodiment.

What is claimed is:

1. A method for controlling the drive of a motor vehicle which has an internal combustion engine comprising a control device to which operating parameters of the drive and parameters influencing the driving operation of the motor vehicle are supplied and on the basis of said parameters the control device implements and terminates the implementation of one or more fuel consumption reduction measures if specific parameter constellations are present, the method comprising the steps of, at the control device during the operation of the vehicle:

selecting at least one of the one or more fuel consumption reduction measures and determining a recommended duration for the selected at least one of the one or more fuel consumption reduction measures, determining an actual duration of the at least one selected fuel consumption reduction measures actually carried out during operation, correlating the recommended duration of the at least one selected fuel consumption reduction measures and the actual duration of the at least one actually carried out fuel consumption reduction measures, and determining a variable therefrom which represents a measure for the implementation of the at least one selected fuel consumption reduction measures.

2. The method according to claim 1, wherein the fuel consumption reduction measure consists in the activation of an automatic stop-start device for the internal combustion engine.

3. The method according to claim 1, wherein the fuel consumption reduction measure consists in a shift recommendation to the driver of the motor vehicle with regard to a gear change that is to be performed.

4. The method according to claim 1, wherein the fuel consumption reduction measure consists in a changeover recommendation to the driver of the motor vehicle with regard to a type of drive to be used for the motor vehicle.

5. The method according to claim 1, wherein the fuel consumption reduction measure consists in a changeover recommendation to the driver of the motor vehicle with regard to a type of fuel to be used for the internal combustion engine.

6. The method according to claim 1, wherein the quotient from the number of actually carried out fuel consumption reduction measures and the number of possible fuel consumption reduction measures is used as the variable.

7. The method according to claim 1, wherein the quotient from the duration of the actually carried out fuel consumption reduction measures and the duration of the possible fuel consumption reduction measures is used as the variable.

8. The method according to claim 1, wherein the difference from the number of actually carried out fuel consumption reduction measures and the number of possible fuel consumption reduction measures is used as the variable.

9. The method according to claim 1, wherein the difference from the duration of the actually carried out fuel consumption reduction measures and the duration of the possible fuel consumption reduction measures is used as the variable.

10. The method according to claim 1, wherein the variable is stored in a storage device of the control device.

11. The method according to claim 10, wherein the variable is stored in a non-volatile manner in the storage device.

12. The method according to claim 10, wherein the variable is read out from the storage device at predefined time intervals.

13. A device for controlling the drive of a motor vehicle, wherein the motor vehicle has an internal combustion engine, comprising a control device to which operating parameters of the drive and parameters influencing the driving operation of the motor vehicle are supplied and on the basis of said parameters the control device implements and terminates the implementation of one or more fuel consumption reduction measures if specific parameter constellations are present, wherein the device is configured to select at least one of the one or more fuel consumption reduction measures and determine a recommended lithe duration of the selected fuel consumption reduction measures possible during the operation of the motor vehicle, determine an actual duration of the selected at least one fuel consumption reduction measures actually carried out during the operation of the motor vehicle, correlate the recommended duration of the selected at least one fuel consumption reduction measures and the actual duration of the selected at least one fuel consumption reduction measures actually carried out, and to derive a variable from said correlation, which variable represents a measure for the implementation of the selected at least one fuel consumption reduction measures.

14. The device according to claim 13, further comprising an automatic stop-start device.

15. The device according to claim 13, wherein the fuel consumption reduction measure of the control device consists in a shift recommendation to the driver of the motor vehicle with regard to a gear change that is to be performed.

16. The device according to claim 13, wherein the fuel consumption reduction measure of the control device consists in a changeover recommendation to the driver of the motor vehicle with regard to a type of drive to be used for the motor vehicle.

17. The device according to claim 13, wherein the fuel consumption reduction measure of the control device consists in a changeover recommendation to the driver of the motor vehicle with regard to a type of fuel to be used for the internal combustion engine.

18. The device according to claim 13, comprising a storage device storing the variable.

19. The device according to claim 18, wherein storage device is a non-volatile storage device.

20. The device according to claim 18, wherein the control device is operable to read out the variable from the storage device at predefined time intervals.

* * * * *